US007960065B2

(12) United States Patent
Hamada et al.

(10) Patent No.: US 7,960,065 B2
(45) Date of Patent: Jun. 14, 2011

(54) SEPARATOR FOR FUEL CELL, METHOD FOR PRODUCING THE SAME, AND FUEL CELL

(75) Inventors: Kenichi Hamada, Osaka (JP); Takayuki Kanematsu, Osaka (JP); Takashi Kawamura, Osaka (JP); Tetsuya Harada, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 727 days.

(21) Appl. No.: 11/916,093

(22) PCT Filed: Jun. 16, 2006

(86) PCT No.: PCT/JP2006/312182
§ 371 (c)(1),
(2), (4) Date: Nov. 30, 2007

(87) PCT Pub. No.: WO2006/137346
PCT Pub. Date: Dec. 28, 2006

(65) Prior Publication Data
US 2010/0015497 A1 Jan. 21, 2010

(30) Foreign Application Priority Data
Jun. 21, 2005 (JP) .................................. 2005-180528

(51) Int. Cl.
*H01M 8/02* (2006.01)
(52) U.S. Cl. ........................................ 429/437; 427/115
(58) Field of Classification Search .................. 429/437; 427/115; 527/27, 25, 30, 32, 33
See application file for complete search history.

(56) References Cited

U.S. PATENT DOCUMENTS

| 4,837,119 A | 6/1989 | Ikoma et al. |
| 6,348,279 B1 | 2/2002 | Saito et al. |
| 6,706,437 B2 | 3/2004 | Trapp et al. |
| 2002/0137806 A1* | 9/2002 | Stone et al. ..................... 521/27 |
| 2003/0054221 A1 | 3/2003 | Saito et al. |
| 2003/0138686 A1 | 7/2003 | Kotani et al. |
| 2003/0194594 A1 | 10/2003 | Nakajima et al. |
| 2004/0146768 A1 | 7/2004 | Nishihata et al. |

FOREIGN PATENT DOCUMENTS

| JP | 64-57568 A | 3/1989 |
| JP | 4-238091 A | 8/1992 |
| JP | 8-138692 A | 5/1996 |
| JP | 8-315810 A | 11/1996 |
| JP | 9-283108 A | 10/1997 |
| JP | 10-3931 A | 1/1998 |
| JP | 10-125300 A | 5/1998 |
| JP | 11-297338 A | 10/1999 |
| JP | 2001-294692 A | 10/2001 |
| JP | 2002-25570 A | 1/2002 |
| JP | 2002-270203 A | 9/2002 |
| JP | 2003-217608 A | 7/2003 |
| JP | 2003-297385 A | 10/2003 |
| JP | 2004-127524 A | 4/2004 |
| WO | 99-40642 A1 | 8/1999 |

OTHER PUBLICATIONS

International Search Report of PCT/JP2006/312182, date of mailing Sep. 19, 2006.
Korean Office Action (Notice of Allowance) dated Jun. 22, 2010, issued in corresponding Korean Patent Application No. 10-2007-7027707.

\* cited by examiner

*Primary Examiner* — Jennifer Michener
*Assistant Examiner* — Monique Wills
(74) *Attorney, Agent, or Firm* — Westerman, Hattori, Daniels & Adrian, LLP

(57) ABSTRACT

The present invention provides a separator for a fuel cell comprising a resin and a conductive material as constituting components, and sulfonic acid groups imparted to at least one portion at the surface of gas channels by a treatment using a sulfuric acid-containing gas, wherein the resin and the sulfonic acid groups, which are on the surface of the gas channels, are bonded, and a ratio of sulfur atoms in the sulfonic acid groups at the surface of the gas channels as determined by energy-dispersive X-ray spectroscopy is in a range from 0.1 to 4.0 at %, and a method for producing the separator. The separator for a fuel cell of the present invention is excellent in the wettability to water, since sulfonic acid groups are imparted to the resin at the surface of gas channels in the sulfuric acid-containing gas.

6 Claims, No Drawings

SEPARATOR FOR FUEL CELL, METHOD FOR PRODUCING THE SAME, AND FUEL CELL

TECHNICAL FIELD

The present invention relates to a separator having a surface excellent in hydrophilicity, a method for producing the separator, and a fuel cEell using the separator.

BACKGROUND ART

A fuel cell is a device which generates electricity or heat energy using an electrochemical reaction between fuel and an oxidizing agent. In general, a fuel cell includes unit cells as a basic structure, each of which contains an electrolyte, two electrodes positioned at both sides of the electrolyte, and two separators provided with channels for flowing fuel such as hydrogen gas or an oxidizing agent such as air, and positioned at both side of the electrodes. When high output is required, a plurality of the unit cells are stacked in series to form a stacked structure, and collects electrical power by power-collecting plates arranged at the both sides of the stack.

A fuel cell has many designs depending on the kind of electrolyte, fuel, oxidizing agent, and the like. Among the designs, a solid polymer fuel cell, which has a solid polymer electrolyte membrane as an electrolyte, uses hydrogen gas as fuel, and air as an oxidizing agent, and a direct methanol fuel cell, which uses hydrogen as fuel which generated from methanol inside thereof, can generate electricity effectively at relatively low operating temperatures such as 100° C. or less.

The separator of these fuel cells is generally a molded plate which is made of a gas-impermeable conductive material containing a conductive material such as graphite and resin, and which has a ribbed structure forming gas channels together with a gas diffusion electrode on the surface thereof. The separator provides supply routes for a reaction gas flowing in the fuel cell by the gas channels, and transfers electricity generated in the fuel cell to the outside. In order to fulfill these functions, the separator is required not only to be made of a material having high conductivity at the surface and in the thickness direction, but also to decrease resistance of the surface in contact with the electrode parts.

To realize this requirement, a separator having a decreased contact resistance to the electrode part and a method for producing the separator are suggested (For example, Patent Documents Nos. 1 and 2). This separator is made by molding a mixture containing a conductive material and a thermoplastic resin or thermosetting resin, and polishing the surfaces of the separator, thereby machining the surface of the separator so as to be adjusted to a specific surface roughness to decrease the contact resistance.

Although, the contact resistance to the electrode part is improved partly in the separator, it is still insufficient. In addition, since the surface is rough, when material having inferior wettability is used, the hydrophilicity of the separator sometimes decreases.

In the fuel cell including the separator, a fuel gas containing hydrogen is supplied to a cathode, and an oxidizing gas containing oxygen is supplied to an anode. When an electrochemical reaction occurs at each electrode, water is generated at the cathode or the anode.

In general, the generated water is evaporated in the oxidizing gas supplied to the anode, and discharged from the fuel cell together with the oxidizing gas. However, when the amount of generated water is large, it is impossible to discharge all generated water only by evaporating in the oxidizing gas. When the generated water, which is not evaporated in the oxidizing agent and remains, forms water droplets around the anode, gas channels are blocked and the flow of the oxidizing gas is prevented around the anode, and this induces a decrease in fuel performance.

Blockage of the gas channels like this may occur not only at the anode but also at the cathode. Although water is not generated at the cathode due to such an electrochemical reaction, water vapor in the fuel gas supplied to the cathode may be concentrated. In general, when the electrochemical reaction proceeds, since protons generated due to a cathode reaction at the cathode side move toward the anode side in the electrolyte membrane while hydrating with a specific number of water molecules, the amount of moisture at the cathode side in the electrolyte membrane is insufficient, and conductivity decreases. In order to prevent such a decrease, the fuel gas supplied to the anode is humidified to compensate for moisture in the electrolyte membrane.

As explained above, water vapor added to the fuel gas may sometimes be concentrated in the gas channels at the time to of starting operation or when the working temperature of the fuel cell decreases and the saturated vapor pressure decreases. In such a case, the gas channels at the cathode side are also blocked preventing the flow of the fuel gas, and this induces a decrease in fuel performance.

As explained above, since protons generated due to the electrochemical reaction at the cathode move toward the anode side while hydrating, water molecules together with the protons reach the anode in addition to the generated water. Due to this, there is a further water exceeds, and the gas channels are easily blocked. This blockage phenomenon is accentuated in a separator for a fuel cell containing a conductive material and resin.

In the past, the attempts have been made to improve discharge efficiency of the generated water is tried to be improved by making the entire surface of the separator for a fuel cell containing a conductive material and resin or the surface of the gas channels hydrophilic. When the material constituting a separator for a fuel cell containing a conductive material and resin is subjected to a hydrophilic treatment, the generated water is not accumulated as water droplets, and is introduced to specific channels. Thereby, it is possible to prevent inhibition of gas diffusion due to the generated water.

The solid polymer fuel cell explained above has a unit cell as a basic unit, which contains a solid polymer membrane as an electrolyte layer, a pair of gas diffusion electrodes sandwiching the solid polymer membrane, and separators sandwiching the gas diffusion electrodes from further outside to separate the fuel gas and oxidizing gas. The solid polymer fuel cell contains a plurality of layered unit cells. In the solid polymer fuel cell, the hydrophilic treatment explained above is not only performed on the separator, but also performed on the gas diffusion electrodes.

Examples of the hydrophilic method for making the separator for a fuel cell having a conductive material and resin hydrophilic include the following methods.

In past days, a method has been suggested, in which a porous water-absorbing carbon material having a pore ratio of 30 to 80% is provided at the inlet or outlet of the gas channels (For example, Patent Document No. 3). However, the separator used in that method has a problem in that hydrophilicity deteriorates as time passes. In addition, the method requires a complex step in which the water-absorbing material is arranged during or after molding, and the method has a problem in the production step.

In addition, as a hydrophilic method, a method has been suggested, in which the surface of the fuel gas channels, and preferably further the surface of the oxidizing gas is covered with a film made of many kinds of hydrophilic resin, hydrophilic organic compounds or hydrophilic inorganic compounds, or coated therewith (For example, Patent Documents Nos. 4 and 5). However, since the separator produced by the method has an insulating film on the surface thereof, this is one factor causing a considerable decrease in conductivity or durability of the fuel cell due to substances being eluted from the film.

Furthermore, as the hydrophilic method, a method has been suggested in which hydrophilic substances such as silicon oxide, aluminum oxide, starch, acrylic acid copolymer resin, polyacrylate, and polyvinyl alcohol, and water-absorbing resin are added to a raw material constituting a conductive separator containing a resin binder to make the separator itself hydrophilic (For example, Patent Document No. 6). However, since the hydrophilic substances or the water-absorbing resin easily absorb water, and many kinds of impurities are eluted from the hydrophilic substances or the water-absorbing resin into water, there is a problem in that performances of the fuel cell having the separator are remarkably inhibited.

In addition, as the hydrophilic method, a method has been suggested in which the surface of the conductive separator made of many kinds of material is subjected to a low-temperature plasma treatment, corona treatment, or ultraviolet irradiation treatment in a hydrophilic gas to make it hydrophilic (For example, Patent Document No. 7). However, the hydrophilic effects decrease as time passes, and there is a case in which the method is required to be carried out in a vacuum in the method. That is, the method has a problem in its process.

Furthermore, a method, in which the surface of the separator is made hydrophilic by carrying out a normal-pressure discharge plasma treatment using a sulfur-containing compound and the like as a treatment gas, has also be suggested (For example, Patent Document No. 8). However, plasma is irradiated to the separator for a fuel cell made of graphite under severe conditions in the method. Therefore, the method has a problem in that graphite on the surface of the separator is oxidized and changes to ash, and this induces a decrease in conductivity or damage of the shape of the molded article, and thus the molded article cannot be used practically as a separator.

[Patent Document No. 1] Japanese Patent Application, First Publication No. 2002-270203

[Patent Document No. 2] Japanese Patent Application, First Publication No. Hei 11-297338

[Patent Document No. 3] Japanese Patent Application, First Publication No. Hei 08-138692

[Patent Document No. 4] Japanese Patent Application, First Publication No. 2003-217608

[Patent Document No. 5] Japanese Patent Application, First Publication No. 2003-297385

[Patent Document No. 6] Japanese Patent Application, First Publication No. Hei 10-3931

[Patent Document No. 7] PCT International Publication No. WO 99/40642 brochure

[Patent Document No. 8] Japanese Patent Application, First Publication No. 2002-25570

DISCLOSURE OF THE INVENTION

Problems to be Solved by the Present Invention

As explained above, the best method for solving the problem of water being generated and accumulated in the channels which cannot be smoothly discharged outside in the separator having a ribbed structure inducing a decrease in electromotive force in the fuel cell, has not yet been found.

It is therefore an object of the present invention is to provide a separator for a fuel cell having improved wettability in the channels, and a method for producing the separator.

Means for Solving the Problem

The present inventors found that a separator having stable hydrophilicity can be produced by subjecting the surface of the separator to a sulfuric acid-containing gas treatment to impart a specific amount of sulfonic acid groups to a resin on the surface of the separator, and achieved the present invention.

In other words, the present invention provides a separator for a fuel cell including a resin and a conductive material as constituting components, and sulfonic acid groups imparted to at least one portion at the surface of gas channels by a treatment using a sulfuric acid-containing gas, wherein the resin and the sulfonic acid groups, which are on the surface of the gas channels, are bonded, and a ratio of sulfur atoms in the sulfonic acid groups at the surface of the gas channels as determined by energy-dispersive X-ray spectroscopy is in a range from 0.1 to 4.0 at %.

In addition, the present invention provides a method for producing a separator for a fuel cell having a ratio of sulfur atoms at the surface of gas channels as determined by energy-dispersive X-ray spectroscopy in a range from 0.1 to 0.4 at % including: contacting a sulfuric acid-containing gas with the surface of the gas channel of the separator for a fuel cell produced by molding a conductive composition containing a resin and a conductive material.

Furthermore, the present invention also provides a fuel cell including the separator.

Effects of the Present Invention

In the separator for a fuel cell according to the present invention, the wettability is improved by imparting sulfonic acid groups to the resin at the surface of the gas channels in the sulfuric acid-containing gas. Therefore, water accumulation due to the inflow of the fuel gas is prevented and water is easily discharged outside the fuel cell including the separator. Thereby, in the fuel cell of the present invention, since supply of the fuel gas is not prevented by excess water, the electromotive force is stable. In addition, the fuel cell of the present invention has no adverse effects of impurities generated by elution or the like, and enables stable electric generation for a long period.

BEST MODE FOR CARRYING OUT THE INVENTION

In the separator for a fuel cell of the present invention, sulfonic acid groups are imparted to at least one portion of the surface of the gas channels formed in the separator for a fuel cell by a sulfuric acid-containing gas treatment to make the surface hydrophilic, and thereby the wettability is improved.

The degree of hydrophilicity is based on the content of sulfur atoms in the sulfonic acid groups at the surface of the channels in the separator.

The amount of sulfur atoms in the sulfonic acid groups is shown by an existent percentage of sulfur atoms at the surface of the gas channels as determined by energy-dispersive X-ray spectroscopy. This is in a range from 0.1 to 4.0 at %, and preferably in a range from 2.0 to 4.0 at %. When the amount of sulfur atoms is in a range from 0.1 to 4.0 at %, hydrophilicity is excellent, and the hydrophilic effects can be maintained for a long period. When the amount of sulfur atoms exceeds 4.0 at %, treatment conditions are consequently severe, and properties of the separator are remarkably degraded, such as roughness at the surface of the separator increasing, water absorbing percentage increasing, or strength decreasing.

Moreover, "a part of the surface of the gas channels" denotes mainly the recess of the gas channels, but may include elsewhere in addition to the recess.

The sulfuric acid-containing gas treatment in the present invention denotes a treatment in which sulfonic acid groups are imparted to the surface of a base by contacting a sulfuric acid-containing gas with the base. As the method for imparting sulfonic acid groups using a sulfuric acid-containing gas, well-known methods are used. Examples of the method include a method in which a material to be a separator is put in a gas such as a sulfur trioxide gas, or a fuming sulfuric acid gas to contact with the sulfuric acid-containing gas. Among these, a method, in which a material to be a separator is put in a sulfur trioxide gas, is preferable, because a sulfur trioxide gas has high reactivity to a base.

Sulfonic acid groups are imparted to the material to be a separator by bonding with a resin at the surface of the gas channels.

Examples of the bonding between sulfonic acid groups and the resin include covalent bonding, coordinate bonding, ionic bonding, hydrogen bonding, van der Waals bonding, etc. Among these, coordinate bonding is preferable because sulfonic acid groups do not readily dissociate or desorb.

Examples of the sulfur trioxide-containing gas used in producing the separator for a fuel cell of the present invention include gaseous sulfur trioxide, and gaseous sulfur trioxide diluted with an inert gas.

As the sulfur trioxide-containing gas, the gaseous sulfur trioxide diluted with an inert gas is preferable, because of enabling accurate control of the ratio of sulfur trioxide relative to the material to be a separator.

The existent percentage of sulfur atoms in sulfonic acid groups at the surface of the gas channels is based on a value determined by energy-dispersive X-ray spectroscopy, and exactly, it is based on a value measured by an energy-dispersive X-ray analyzer.

The energy-dispersive X-ray analyzer is a measuring device in which X-rays generated from elements are analyzed by spectroscopy using an energy-dispersive type semiconductor detector.

Examples of the specific measuring method include a method in which the surface of the separator is analyzed at 100× magnification using an energy-dispersive X-ray analyzer, characteristic X-rays for elements generated by electron beam irradiation are detected, and the kind and amount of the elements are examined based on the position and the strength of the peaks in the obtained spectrum.

Examples of the energy-dispersive type X-ray analyzer include JSM-5900LV (marketed by JEOL Ltd.).

In addition, sulfonic acid groups at the surface of the separator can be detected using an X-ray photoelectron spectrometer (ESCA).

Examples of the inert gas include gases which substantially do not react with sulfur trioxide and any materials constituting the separator, and are dried to have as little moisture content as possible. Specifically, air, carbon dioxide gas, helium, dried nitrogen, dried argon, and mixtures thereof are exemplified.

The sulfur trioxide diluted with the inert gas is a gas in which gasified sulfur trioxide (boiling point: 44.8° C.) is diluted with air, carbon dioxide gas, nitrogen, inert gas such as helium, argon, etc. The concentration of sulfur trioxide gas in the sulfur trioxide diluted with the inert gas is not particularly limited, but this is preferably in a range from 0.1 to 80% by volume.

Examples of the sulfur trioxide-containing gas include a mixture containing a gaseous Lewis base and sulfur trioxide, a mixture containing a gaseous Lewis base, sulfur trioxide, and the inert gas, etc.

In general, the molar ratio between sulfur trioxide and the Lewis base in the sulfur trioxide-containing gas is adjusted freely depending on a material or an object.

Examples of a method for contacting the material to be a separator for a fuel cell with the sulfur trioxide-containing gas to impart sulfonic acid groups at the surface of the gas channels include a batch method in which the material to be a separator for a fuel cell is stored in an acid-resistant sealed container through which the sulfur trioxide-containing gas flows and a continuous method in which the material to be a separator passes continuously in a chamber through which the sulfur trioxide-containing gas flows.

The contact is achieved by adjusting the contact time between the material to be a separator and the sulfur trioxide-containing gas, the gas temperature, the temperature of the sealed container, and the flow rate of the sulfur trioxide gas. The contact time is generally in a range from 0.1 second to 120 minutes, and preferably in a range from 1 to 60 minutes. When the contact time is in the range from 0.1 second to 120 minutes, the separator is uniformly treated, and desired effects can be achieved. In general, the temperature of the sealed container is preferably in a range from 0 to 100° C., more preferably in a range from 10 to 90° C., and most preferably in a range from 20 to 80° C.

In the case of putting the entire material to be a separator in the sealed container, when the gas flow rate is large, and the treatment time is long, desired effects can be achieved. However, as long as the sulfur trioxide-containing gas is supplied only to the gas channels, even when the amount is small, and the treatment time is short, a specific amount of sulfonic acid groups can be bonded to the surface of the material to be a separator. When the entire material to be a separator is put in the container, the flow rate of the sulfur trioxide-containing gas is generally in a range from 0.01 to 10,000 ml/min. as converted to 100% of sulfur trioxide gas. When the flow rate is in this range, the treatment time is appropriate, and effective. The flow rate varies depending on the size of the sealed container, and is preferably 0.5 to 5 times per minute relative to 1 capacity of the sealed container.

In addition, when the sulfonic acid groups are imparted, it is preferable to pretreat the material to be a separator for a fuel cell before contacting with the sulfur trioxide-containing gas. When the separator for a fuel cell is pretreated, sulfonic acid groups can be imparted within a shorter time compared with a case having no pretreatment.

Examples of the pretreatment include drying. If only a small amount of moisture is in the system, there is a possibility of the sulfur trioxide in the sulfur trioxide-containing gas being converted into concentrated sulfuric acid.

Examples of the drying method include a method in which the separator is left at rest in a desiccator containing a desiccant agent such as silica gel, a method in which the separator is left at rest in a dryer at room temperature or higher, such as 50° C., a method in which moisture in the separator is removed using a vacuum dryer, etc.

In addition, examples of the pretreatment include a heat treatment, a flame treatment, an ultraviolet ray irradiation treatment, a plasma treatment, etc. in addition to drying.

In addition, it is preferable to conduct a post treatment immediately after imparting sulfonic acid groups to the material to be a separator in order to remove sulfuric acid remaining at the surface of the material to be a separator in the present invention. Examples of the post treatment include washing with water, and washing with an alkali solution such as a sodium hydrogen carbonate aqueous solution, calcic aqueous solution, etc. It is preferable to further wash with ionic water at 10° C. or higher after washing with an alkali solution.

The separator of the present invention has improved wettability at the surface of the gas channels by imparting sulfonic acid groups at the surface of the gas channels.

The wettability in a separator for a fuel cell is evaluated based on a contact angle with water. The contact angle is 80 degrees or less, and preferably 70 degrees or less. When the contact angle with water is 80 degrees or less, water generated during operation of the separator for a fuel cell is discharged from the separator without accumulation in the gas channels, and thereby stable voltage can be maintained.

In addition, the separator for a fuel cell imparted with sulfonic acid groups is required to maintain elution properties before imparting. When the elution properties do not deteriorate, it is possible to obtain a separator for a fuel cell having excellent stability for a long period and discharging water properties.

The elution properties are considered based on electric conductivity. When the separator before and after imparting sulfonic acid groups is left at rest in ion-exchanged water at 95° C. for 60 hours each time, then electric conductivity of the ion-exchanged water is measured, and the electric conductivity after imparting is twice or less the electric conductivity before imparting, the elution properties are preferable.

The separator for a fuel cell of the present invention is obtained by molding a conductive composition containing a resin and a conductive material.

Examples of the conductive material include metal or conductive inorganic oxides such as metal powders, metal fibers, and tin oxides, artificial graphite, imbricate natural graphite, aggregated natural graphite, expanded graphite, carbon nanotube, PAN or pitch graphite fiber, PAN or pitch carbon fiber, graphite powder obtained from mesophase pitch graphite, carbon black, acetylene black, Ketjenblack, amorphous carbon, etc. These may be used singly or as combinations of two or more thereof. Among these, graphite is preferable because the separator containing graphite has improved conductivity. In addition, the average particle diameter of the conductive material is preferably in a range from 100 to 400 μm. In particular, the conductive material having an aspect ratio in a range from 1 to 5, and the average particle diameter in a range from 200 to 300 μm is most preferable. Furthermore, milled fiber, chopped fiber, non-woven cloth, mat, sheet, paper, film, etc. made of these conductive fibers can be also used as the conductive material in the present invention.

The content of the conductive material in the conductive composition is preferably in a range from 50 to 90% by weight, and more preferably in a range from 60 to 85% by weight.

A thermosetting resin and a thermoplastic resin are used as the resin in the present invention. In addition, a mixture containing two or more resins selected from them is also used. Examples of the thermosetting resin include polycarbodiimide, phenol resin, furfurylalcohol, epoxy resin, urea resin, melamine resin, unsaturated polyester resin, vinylester resin, bismaleimidetriazine resin, polyamino bismaleimide resin, diallylphtalate resin, etc. Among these thermosetting resins, phenol resin and vinylester resin are preferable because of having excellent acid resistance. These thermosetting resins are used in a powdered state or liquefied state without modification, or they are used by dissolving in a solvent such as water, alcohol, ketone, or a reactive diluent such as styrene.

Examples of the thermoplastic resin include polyarylenesulfide, polyolefin, polyamide, polyimide, polysulfone, polyphenyleneoxide, liquid crystal polyester, polyester, etc. Among these thermoplastic resins, polyarylenesulfide is preferable because of the heat resistance, and polyolefin is also preferable because sulfur atom-containing groups are easily adhered thereto.

Examples of the state of the thermoplastic resin include powder, particle, film, woven cloth, non-woven cloth, mat, sheet, etc. Among these, a non-woven cloth state and a film state are preferable because of ease of handling.

When the thermosetting resin is used as the resin, the conductive composition can contain a thickener, a shrinkage reducing agent, a radical polymerization initiator, a polymerization inhibitor, an internal mold release agent, a compatibilizer, other fillers, pigments, etc.

The amount of additives used may be adjusted freely depending on the kind of thermosetting resin, and intended purpose of the mold.

Examples of the thickener include isocyanate compounds, acryl resin powder, metal oxides, etc.

Examples of the shrinkage reducing agent include thermoplastic resins. Examples of the thermoplastic resin include styrene copolymers such as polystyrene, a copolymer containing styrene and (meth)acrylate, a styrene-conjugated diene block copolymer, a styrene-hydrogenated conjugated diene block copolymer, etc.; (meth)acrylate polymer containing no styrene such as methyl polymethacrylate, and n-butylester polyacrylate, polyvinyl chloride, polyethylene, polyphenylene ether, polyvinyl carbazole, etc. Among these thermoplastic resins, polystyrene and polyphenylene ether are preferable because of their water resistance.

Examples of the radical polymerization initiator include a thermal polyermization initiator, an ultraviolet ray polymerization initiator, an electron beam polymerization initiator, etc. The amount of radical polymerization initiator used is preferably in a range from 0.1 to 10 parts by weight, and more preferably in a range from 1 to 5 parts by weight relative to 100 parts by weight of the resin component. Examples of the thermal polymerization initiator include organic peroxides such as diacylperoxide, peroxyester, hydro-peroxide, ketone peroxide, alkyl perester, percarbonate, etc. Among these, a suitable thermal polymerization initiator is selected depending on molding conditions. Examples of the ultraviolet ray polymerization initiator include photosensitive substances such as acylphosphine oxide, benzoin ether, benzophenone, acetophenone, thioxantone, etc. Among these, a suitable ultraviolet ray polymerization initiator is selected depending on molding conditions. In addition, examples of the electron beam polymerization initiator include halogenated alkylbenzene, disulfide, etc.

As the polymerization inhibitor, well-known polymerization inhibitors may be used. Examples of the polymerization inhibitor include hydroquinone, p-t-butyl catechol, t-butylhydroquinone, toluhydroquinone, p-benzoquinone, naphtoquinone, hydroquinone monomethyl ether, phenothiazine, copper naphthenate, copper chloride, etc. These may be used singly or as combinations of two or more thereof.

Examples of the internal mold release agent include paraffin compounds such as carnauba wax, high fatty acids such as stearic acid, and montanic acid, high fatty acid salts such as zinc stearate, fatty acid esters, alkylphosphoric acid esters, denatured silicone oils, denatured fluorine compounds, etc.

The internal mold release agent may be selected depending on molding conditions and intended purpose.

The compatibilizer prevents separation with time due to the addition of the shrinkage reducing agent such as polystyrene, and disperses the shrinkage reducing agent. Examples of the compatibilizer include vinyl group-containing compounds such as a vinyl group-containing polystyrene, a vinyl group-containing styrene copolymer, a vinyl group-containing acrylester copolymer, etc.

As the other fillers, a radical polymerization accelerator, that is, a hardening accelerator may be used to accelerate hardening, together with the radical polymerization initiator. Examples of the hardening accelerator include metal salts such as cobalt naphthenate, and cobalt octenate, tertiary amines such as N,N-dimethylaniline, N,N-di(hydroxyethyl) paratoluidine, and dimethylacetoacetamide, etc. These may be freely selected if necessary.

In addition, in order to improve toughness or impact resistance, a rubber resin is preferably added as the filler. Examples of the rubber type resin include acrylonitrile butadiene resin, cross-linked rubber fine particles, etc.

When the thermosetting resin is used, additives such as a thermal stabilizer, a diluent, a reactive diluent, a conductive filler, an antioxidant, a mold release agent, a lubricant, an antistatic agent, a photostabilizer, an ultraviolet ray absorber, a fire retardant, etc. may be added, if necessary.

The amount of additives used may be adjusted freely depending on the kind of the resin used, and intended purpose of the mold.

In addition, when the conductive composition contains the thermoplastic resin as the resin, a thermoplastic elastic body can be added to the thermoplastic resin as an impact resistance improver. Examples of the impact resistance improver include olefin resin, acrylic rubber, styrene elastomer, nitrile elastomer, etc. which have an organic functional group in the molecule.

The material to be a separator for a fuel cell can be produced using the conductive composition by the following production method, for example.

When the conductive composition contains the thermosetting resin, first, a pre-form containing the thermosetting resin and the conductive material in non-hardened states is produced, then the pre-form is put in a die for molding a separator, and heated and pressed to mold. The heating temperature varies depending on the kind of thermosetting resin used, but in general, it is in a range from 100 to 200° C. In addition, in general, the pressure is preferably in a range from 5 to 60 MPa.

When the conductive composition contains the thermoplastic resin, well-known methods can be used. Examples of the well-known method for producing the material to be a separator using the conductive composition containing the thermoplastic resin include (1) a method including a melting and kneading step for the conductive composition and (2) a method including no melting and kneading step.

Examples of the method (1) include a method, in which the thermoplastic resin and the conductive material are melted and kneaded by an extrusion machine to make the composition in a pellet shape, irregular particle shape, powder shape, sheet shape, or a film shape, the extruded material is dried, then this is molded using an injection molding machine, injection pressing machine, etc., and a method in which the dried sheet or film is molded by a press molding machine in a stampable molding method.

Examples of the method (2) include a method in which a material in a sheet shape produced by another method is molded, a method in which the thermoplastic resin powder is mixed with graphite powder or graphite particles and the obtained mixture is molded, etc.

Specifically, examples of the method (2) include a method (a), in which a conductive material in a particle shape (this is abbreviated as "conductive particles" below) is adhered to a resin sheet such as a non-woven resin cloth without an adhesive, a method (b), in which conductive particles are adhered to a resin sheet such as a non-woven resin cloth via an adhesive, etc. Among these methods, the method (a) is preferable because of enabling an increase in the content of the conductive particles in the molding material. More specifically, the method (a) includes the following steps (a1) and (a2) in sequence.

The step (a1) is a step of dispersing uniformly the conductive particles on the surface of the resin sheet. It is preferable that the conductive particles be dispersed over the entire surface of the resin sheet to make the contact area between the conductive particles and the resin sheet as large as possible.

The dispersing method of the conductive particles is not particularly limited. However, examples of the dispersing method include a method (i), in which a required amount of the conductive particles are uniformly dispersed on the resin sheet using a dispersing machine having many nozzles, a method (ii), in which an excess amount of the conductive particles are placed on one side on the resin sheet, then the conductive particles are spread over the entire resin sheet by a squeegee plate. The method (ii) is preferable because this method produces a layer which has a more even surface on which conductive particles are dispersed more uniformly. In the method (ii), it is preferable that the amount of conductive particles used be twice or more the amount of the conductive particles to be adhered to the resin sheet.

The step (a2) is a step of adhering a part of the conductive particles on the resin sheet.

Examples of the method of adhering the conductive particles include a method (a2-1), in which after dispersing the conductive particles on the surface of the resin sheet, the conductive particles are pressed to the resin sheet using a pressure roll or a press machine, and the conductive particles are forced in the resin sheet, a method (a2-2), in which when the resin sheet is made of fibers such as an non-woven cloth, the conductive particles are pressed to the resin sheet and the conducive particles are entwined with the fibers, and a method (a2-3), in which when the resin sheet is softened or melted by heat, after a part or the all the resin sheet is melted by heating the resin sheet and/or the conductive particles, the conductive particles are thermally adhered to the resin sheet. Moreover, the methods (a2-1), (a2-2), and (a2-3) are used individually or in combination of two or more.

Examples of the thermal melting method in the method (a2-3) include a calendar roll method, a method using a hot wind heater, a far infrared ray heater, or moisture vapor, etc. In order to prevent the dispersal of the conductive particles, a method using a calendar roll, and a method using a far infrared ray heater are preferable. When the thermoplastic resin is amorphous, the heating device is preferably heated to the glass transition temperature or higher of the thermoplastic resin. When the thermoplastic resin is crystalline but is not crystallized, the heating device is preferably heated to the glass transition temperature or higher and lower than the crystalline starting temperature. When the thermoplastic resin is crystalline, the heating device is preferably heated to a temperature lower than the melting point of the thermoplastic resin by 10° C. or higher.

In the step (2) having no melting and kneading step, when a mixture is obtained by mixing the thermoplastic resin powder with the graphite powder or the graphite particles, the graphite and the resin powder are easily separated. In order to prevent the separation and mix uniformly the resin and the graphite, it is preferable that the resin be thermally adhered to the graphite by heating, the resin be firmly fixed as an adhesive to the graphite, or a slurried resin be mixed with the graphite.

The material to be a separator for a fuel cell used in the present invention can be produced by putting the conductive composition in a molding die at a temperature more than the glass transition temperature when the thermoplastic resin in the conductive composition is amorphous, or a temperature more than the melting point when the thermoplastic resin is crystalline, pressing, and cooling while pressing to press mold. The cooling rate can be selected freely. In general, the pressure is preferably in a range from 5 to 100 MPa. In addition, the separator for a fuel cell of the present invention can also be produced by using the thermoplastic resin sheet or a powder material which is blocked in advance, and this is subjected to a stampable molding.

In the present invention, the separators, one of which has grooves as the channels for fuel gas such as hydrogen gas at one surface, and grooves as the channels for cooling water at another surface, and another of which has grooves as channels for oxidizing gas such as air at one surface, and grooves as the channels for cooling water at another surface, are used in pairs. Moreover, the separators having one surface including grooves as the gas channels, and the other surface being flat are also used in pairs.

The separators for a fuel cell of the present invention are used by bonding directly to both surfaces of the electrolyte membrane electron assembly (MEA) or bonding via the gas diffusion layer (GDL) to produce unit cells, and combining the unit cells to produce a fuel cell stack. Examples of the fuel cell include a solid polymer fuel cell.

EXAMPLES

Below, the present invention is explained in detail with reference to Examples and Comparative Examples. The "parts" and "%" are expressed hereinafter on the basis of weight unless otherwise specified.

Measurement methods and evaluation standards of the electric resistance, wettability, elution properties, and water discharging properties in the separator for a fuel cell, and the fuel cell of the present invention are explained below.

(Sample Preparation)

A specified amount of the conductive composition containing the thermosetting resin used in the following Examples was filled in a flat plate die, and this was molded by a compression molding machine under conditions in which the pressure was 140 kgf/cm$^2$ (gage pressure), the temperature of the upper die was 150° C., the temperature of the lower die was 145° C., and the molding time was 5 minutes to produce a molded article in a plate shape having a size of 130 mm in width, 200 mm in length, and 3 mm in thickness. The molded article in a plate shape was divided to produce a sample having the following size, and the electric resistance, wettability, and elution properties were evaluated.

A separator for a fuel cell having the same size as the experimental separator for a fuel cell disclosed in Japan Automobile Research Institute (JARI) and a thickness of 5.0 mm was produced. Then, a single cell stack for a fuel cell was assembled using the produced separators.

<Separator for a Fuel Cell>
(Measuring Method of the Electric Resistance)

The molded article in a plate shape was divided into a size of 50 mm in width, 50 mm in length, and 3 mm in thickness to produce samples. The electric resistance in the thickness of the sample was measured.

Specifically, the sample was sandwiched between two copper plates with a gold plated electrode, and an alternate current of 10 mA was applied under a pressure of 1 MPa by a hydrostatic press. The electric resistance in the thickness direction was measured based on the voltage drop $\Delta V$ ($\mu V$) between the electrodes under such conditions. The electric distance was an average value of three measurement results.

(Evaluation Method of the Wettability Evaluation)

The contact angle at the surface of the samples having the same size as the sample used in measuring the electric resistance was measured by a drop method using ion-exchanged water. The machine used was CA-Z, marketed by KYOWA INTERFACE SCIENCE CO. LTD. The wettability was evaluated based on an average value of the eight measurement results. The temperature during the measurement was 22° C., and the humidity was 60%. In general, the smaller the contact angle, the better the wettability.

(Evaluation Method of the Elution Properties)

A sample was produced by cutting the molded articles to a size of 25 mm×70 mm. Four samples were put in a container made of a fluorine resin containing 400 g of ion-exchanged water, and the container was sealed. The sealed container was put in a dryer at 95° C., and this was boiled for 60 hours. After cooling gradually to room temperature, the samples were removed from the container. Then, the ion-exchanged water used was replaced with fresh ion-exchanged water, and the samples were boiled again under the same conditions. The electric conductivity of the remaining ion-exchanged water after the second time the sample was removed (below, abbreviated as "Sample 1") was measured by ES-51, marketed by HORIBA, Ltd. to evaluate the elution properties. In general, the smaller the amount of electrolytic material eluted, the smaller the electric conductivity.

(Measuring Method of the Sulfur Content)

Elements at the surface of the sample 1 were analyzed at 100× magnification using an energy-dispersive X-ray spectroscopy (JED-2200, marketed by JEOL Ltd.), and the percentage of sulfur atoms was measured.

(Identification Method of Sulfonic Acid)

Sulfonic acid at the surface of the sample 1 was identified using a high-performance X-ray photoelectron spectrometer (AXIS-HS, marketed by Kratos Ltd.) under conditions of Mg-ka ray, 15 kV, and 10 mA. After analyzing the S2p narrow scan photoelectron spectrum, a bonding energy peak derived from a sulfonic acid group was observed.

<Fuel Cell>
(Evaluation Method of the Water Discharging Properties)

Utilization percentage of the fuel cell was changed every 10% in a range from 30 to 80% under conditions in which the current density was 0.2 A/cm$^2$, the separator temperature was 80° C., and the temperature of water for humidification was 70° C., and the electric power was generated for 10 minutes at every utilization percentage. Then, the utilization percentage at which the voltage started to swing widely was measured. The higher the utilization percentage at which the voltage swings, the better the water discharging properties are, and more stable electric generation properties can be realized.

Examples 1 and 2

The following components were mixed uniformly, the obtained mixture was sealed with an impermeable multilayered film made of a styrene monomer, and then this was left at rest at room temperature for 24 hours to produce a conductive composition.

| | | |
|---|---|---|
| (1) | Vinyl ester resin (Bispnenol A type vinyl ester resin; number average molecular weight: 633 (measure by GPC)) | 18.8% |
| (2) | Tertiarybutylperoxyisopropyl carbonate (hardening agent) | 0.2% |
| (3) | Acrylic resin powder | 3.0% |
| (4) | Graphite powder (average particle diameter: 300 μm) | 78% |

The conductive composition was molded under the above-mentioned conditions to produce a molded plate for evaluations. Then, sulfonic acid groups were imparted to the molded plate under the following conditions (below, this treatment is abbreviated as "sulfonation treatment").

The molded plate was dried at 100° C. for 3 hours, the dried molded plate was put in an acid-resistant sealed container having a capacity of 5 L through which sulfur trioxide diluted 10-fold with nitrogen gas was passed at 5,000 ml/min. The molded plates were left at rest at 60° C. for 5 minutes and 10 minutes respectively before subjecting to the sulfonation treatment. After the sulfonation treatment, the molded plate was washed with a sodium hydrogen carbonate aqueous solution, this was further washed with ion-exchanged water, then dried to produce a molded plate subjected to the sulfonation treatment.

The produced molded plate after the sulfonation treatment was cut into a specific size, and the content of sulfur atoms, electric resistance, wettability, and elution properties were evaluated. The results are shown in Table 1. In addition, a bonding energy peak derived from a sulfonic acid group was confirmed at 169 eV in the spectrum obtained by the high-performance X-ray photoelectron spectrometer.

Comparative Example 1

The molded plate was produced and evaluated in a manner identical to that of Example 1, except that the molded plate was subjected to a blast treatment such that the average roughness (Ra) at the surface was 1.1 μm, instead of the sulfonation treatment. The results are shown in Table 1.

Comparative Example 2

The molded plate was produced in a manner identical to that of Example 1, except that the molded plate was subjected to a blast treatment such that the average roughness (Ra) at the surface was 1.1 μm, instead of the sulfonation treatment, and that a coating composition having the following composition was coated on the molded plate as a hydrophilic resin coating so as to be about 12 μm in thickness using a hand-coater.

| | | |
|---|---|---|
| (1) | DENACOL EXB614B (hydrophilic epoxy resin, marketed by Nagase Chemtech Corp.) | 90% |
| (2) | Aminoethylethanol amine (hardening agent) | 10% |

The molded plate coated with the coating was heated to 60° C. for 10 minutes, and further 180° C. for 60 minutes to produce a hardened coating. The thickness of the hardened coating was about 10 μm.

The molded plate coated with the hardened coating containing the hydrophilic resin was evaluated similarly to Example 1. The results are shown in Table 1.

Comparative Example 3

A graphite plate (IG-11, marketed by TOYO TANSO Co., Ltd.) was cut into a specific size, and subjected to the sulfonation treatment. The produced sulfonated graphite plate was evaluated similarly to Example 1. The results are shown in Table 1. In addition, a bonding energy peak derived from a sulfonic acid group was not recognized at 169 eV in the spectrum obtained by the high-performance X-ray photoelectron spectrometer.

TABLE 1

| Evaluation Item | Unit | Example 1 | Example 2 | Comparative Example 1 | Comparative Example 2 | Comparative Example 3 |
|---|---|---|---|---|---|---|
| Sulfonation treatment time | minute | 5 | 10 | — | — | 5 |
| Sulfur atom content | % by mass (at %) | 8.4 (3.2) | 10.5 (4.0) | — | — | 0.0 |
| Electric resistance | mΩ · cm | 52 | 39 | 60 | 250 | 5 |
| Contact angle | degree | 45 | 29 | 105 | 49 | 90 |
| Electric conductivity of water after elution test | mS/m | 0.78 | 0.91 | 0.71 | 11.4 | 0.35 |

The molded articles produced by the production method of the present invention are excellent in the wettability, reduce the generation of eluted substances, and have excellent conductivity. In contrast, the molded article subjected to the blast treatment in Comparative Example 1 has remarkably inferior wettability to water. The molded article having the coating containing the hydrophilic epoxy resin in Comparative Example 2 has good wettability, but the conductivity is low, and a large amount of substance is eluted with water. Although the graphite plate was subjected to the sulfonation treatment, hydrophilicity was not applied, and the contact angle was large.

Example 3 and Comparative Example 4

On a non-woven cloth made of PPS fibers (weight: 15 g/m$^2$; thickness: 60 μm; average size of pores: 38 μm; pore percentage: 85%; melting point: 285° C.), 5 g of artificial graphite particles (amorphous; average particle size: 88 μm) were dispersed. Then, spacers of 0.8 mm in height were placed at both sides of the non-woven cloth, and a squeegee plate was moved from one spacer toward the other spacer such that the artificial graphite particles were spread on the entire surface of the non-woven cloth.

After that, a calendar roll heated to 285° C. in advance was moved from one side to the opposite side while being pressed on the graphite particles on the non-woven cloth. After natural cooling, the artificial graphite particles, which were not adhered to the non-woven cloth, were removed by an air-blowing (5 kgf/cm$^2$) to produce a molded material in a sheet shape having an apparent thickness of 0.15 mm, weight of 75 g/cm$^2$, and pore percentage of about 73%.

The produced sheet was molded by a stampable molding method. Specifically, 70 sheets were stacked, heated to 340° C. by a far-infrared heater to melt PPS fibers, and these were put in a die heated to 150° C. attached to a press molding device. Then, this was pressed at 40 MPa to shape, and solidified by cooling to produce molded plates like the molded plate in Example 1.

The produced molded plate, that is, the separator, was subjected to the sulfonation treatment similarly to Example 2. A bonding energy peak derived from a sulfonic acid group was confirmed at 169 eV in the spectrum obtained by the high-performance X-ray photoelectron spectrometer.

Moreover, in Comparative Example 4, a comparative separator was produced by subjecting a molded plate, which was not subjected to the sulfonation treatment, to the blast treatment such that the average roughness (Ra) at the surface thereof was 1.1 μm.

Similarly to Example 1, the electric resistance, wettability, and elution test were performed using the obtained separators. The results are shown in Table 2.

TABLE 2

| Evaluation Items | Unit | Comparative Example 3 | Comparative Example 4 |
|---|---|---|---|
| Sulfonation treatment time | minute | 5 | — |
| Sulfur atom content | % by mass (at %) | 9.1 (3.5) | — |
| Electric resistance | mΩ · cm | 6 | 7 |
| Contact angle | degree | 38 | 105 |
| Electric conductivity of water after elution test | mS/m | 0.35 | 0.34 |

In Table 2, "Sulfur atom content" means a value obtained by leaving the sulfur atom content in PPS before the sulfonation treatment from the sulfur atom content in PPS after the sulfonation treatment.

Example 4 and Comparative Example 5

The separator produced in the "Sample Preparation" was subjected to the sulfonation treatment under the same conditions as those in Example 2. The water discharging properties were evaluated using the separator.

In Comparative Example 5, the electric generation properties, that is, the water discharging properties were evaluated similarly to Example 3 using the separator which was subjected to the blast treatment such that the average roughness (Ra) at the surface thereof was 1.1 μm.

As a result, the voltage started to swing at 70% of the utilization percentage in the fuel cell provided with the separator in Example 4, but the voltage started to swing at 50% of utilization percentage in the fuel cell provided with the separator in Comparative Example 5. In addition, a bonding energy peak derived from a sulfonic acid group was confirmed at 169 eV in the spectrum obtained by the high-performance X-ray photoelectron spectrometer in Example 4.

It was confirmed that the fuel cell containing the separator of the present invention is excellent in discharge properties to the generated water; therefore, this provided stable electric generation properties at a higher utilization percentage, compared with the fuel cell containing the separator in Comparative Example.

INDUSTRIAL APPLICABILITY

Since the separator for a fuel cell of the present invention has improved wettability to water in channels, and is excellent in hydrophilicity at the surface, when the separator is assembled in a fuel cell, there is no accumulation of water generated due to the inflow of the fuel gas, and the water is effectively discharged to the outside of the fuel cell. Since the fuel cell of the present invention can stably generate electricity for a long period of time, the fuel cell of the present invention is extremely useful as a power supply for various sorts of industrial use and household use.

The invention claimed is:

1. A separator for a fuel cell comprising
a bipolar plate comprised of a resin and a conductive material as constituting components, and sulfonic acid groups imparted to at least one portion at the surface of gas channels by a treatment using a sulfur trioxide gas, wherein the resin and the sulfonic acid groups, which are on the surface of the gas channels, are bonded, and a ratio of sulfur atoms in the sulfonic acid groups at the surface of the gas channels as determined by energy-dispersive X-ray spectroscopy is in a range from 0.1 to 4.0 atomic %.

2. A method for producing a separator for a fuel cell in which resin and sulfonic acid groups, which are on a surface of gas channels, are bonded, and a ratio of sulfur atoms in the sulfonic acid groups at the surface of gas channels as determined by energy-dispersive X-ray spectroscopy is in a range from 0.1 to 0.4 atomic % comprising:
contacting a sulfuric acid-containing gas with the surface of the gas channels of a material to be a separator for a fuel cell comprised of a bipolar plate produced by molding a conductive composition containing a resin and a conductive material, and imparting the sulfonic acid groups to at least one portion at the surface of the gas channels.

3. A method for producing a separator for a fuel cell according to claim 2, wherein the sulfuric acid-containing gas is a sulfur trioxide gas.

4. A method for producing a separator for a fuel cell according to claim 2, wherein after the material to be a separator is subjected to a pretreatment, the material to be a separator is contacted with the sulfuric acid-containing gas.

5. A fuel cell comprising the separator according to claim 1.

6. A fuel cell comprising the separator according to claim 1.

* * * * *